Dec. 23, 1941.　　　D. A. RIZOR　　　2,267,577
DRIVE MECHANISM
Filed Sept. 29, 1939　　　2 Sheets-Sheet 1

Inventor:
Delbert A. Rizor
By:
Parker, Carlson, Pitzner & Hubbard
Attorneys.

Dec. 23, 1941.  D. A. RIZOR  2,267,577
DRIVE MECHANISM
Filed Sept. 29, 1939  2 Sheets-Sheet 2
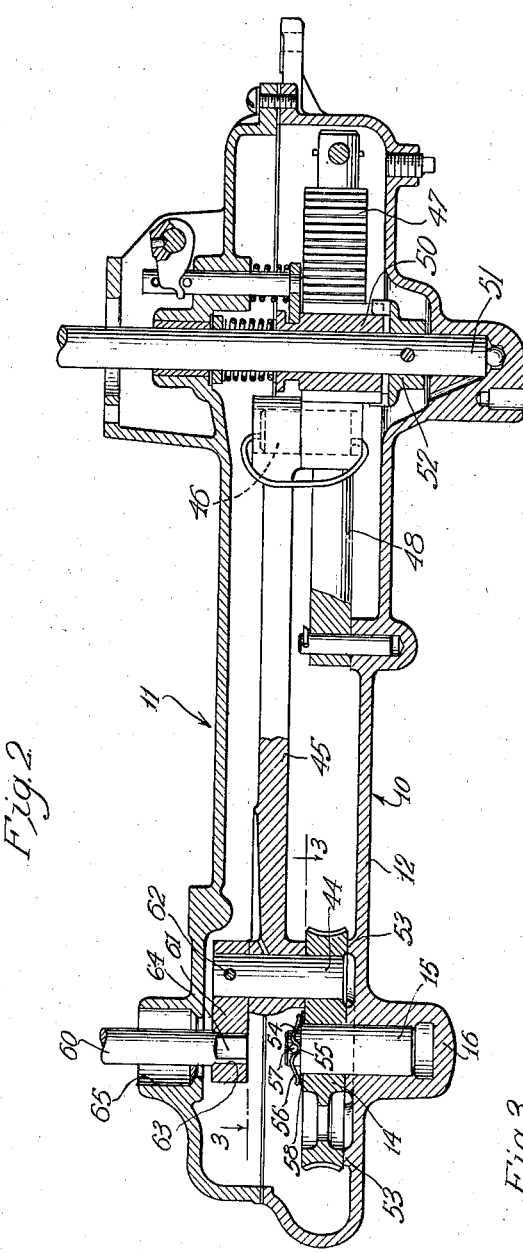
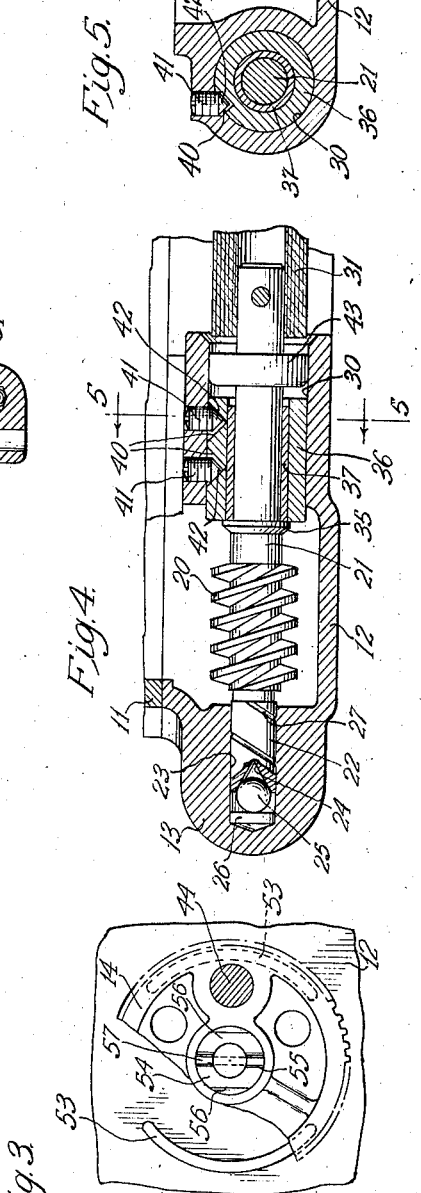
Inventor:
Delbert A. Rizor
By:
Parker, Carkson, Pitzner & Hubbard
Attorneys:

Patented Dec. 23, 1941

2,267,577

UNITED STATES PATENT OFFICE 2,267,577

DRIVE MECHANISM

Delbert A. Rizor, Fairfield, Iowa, assignor to The Dexter Company, Fairfield, Iowa, a corporation of Iowa Application September 29, 1939, Serial No. 297,078

7 Claims. (Cl. 74—77)

The invention relates generally to gearing and more particularly to a drive mechanism for an oscillatory type of washing machine.

The general object of the invention is to provide a drive mechanism the parts of which are so arranged as to reduce wear and consequent looseness to a minimum and to provide a simple structure for taking up such wear as occurs.

Another object is to provide a drive mechanism connected to a motor by means of a worm and worm wheel, in which a novel means is provided for taking up the endwise wear of the worm, such means being readily accessible from the exterior of the casing in which the drive mechanism is housed and permitting the casing to be securely closed to prevent the loss of lubricant therefrom.

It is also an object to provide a drive mechanism of the type employing a gear provided with a crank pin for a pitman, in which a novel support for the gear is provided to compensate for the tendency of the thrust of the pitman to tilt the gear.

A further object is to provide a novel mounting for the gear mentioned in the foregoing object, which automatically takes up wear and provides a small drag or braking action and thereby causes the mechanism to run more smoothly.

Still another object is to provide a drive mechanism having a simple arrangement of parts facilitating the assembly and disassembly thereof.

Other objects and advantages will become apparent from the following description taken in connection with the accompanying drawings, in which:

Fig. 2 is a vertical section taken on the line 2—2 of Fig. 1.

Fig. 3 is a fragmentary horizontal section taken on the line 3—3 of Fig. 2.

Fig. 4 is an enlarged fragmentary section taken on the line 4—4 of Fig. 1.

Fig. 5 is a fragmentary section taken on the line 5—5 of Fig. 4.

Figure 1:
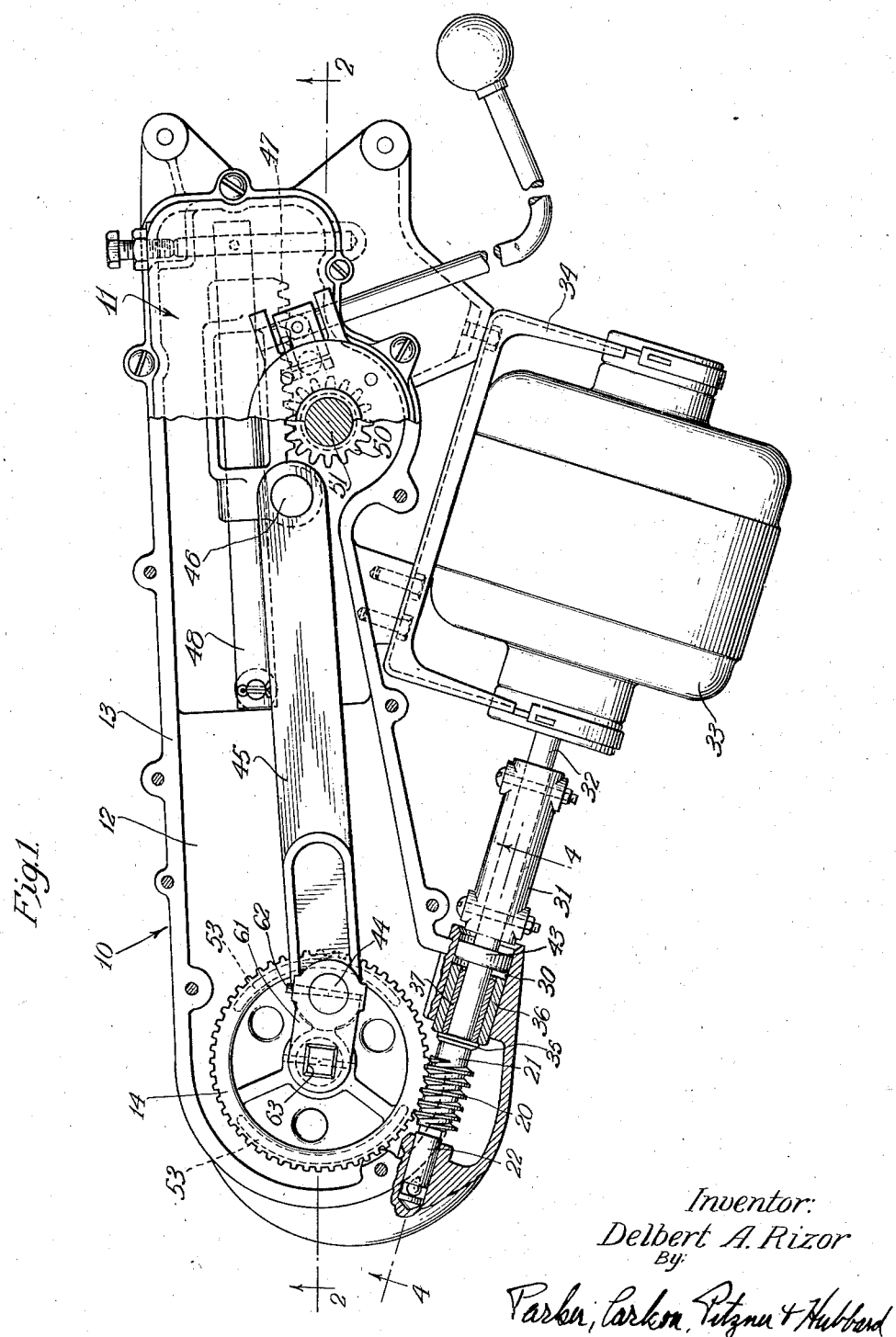
Figure 1 is a plan view, partially broken away, of a mechanism embodying the features of the invention.

The mechanism illustrated and described herein and embodying the features of the invention is designed for use in a washing machine preferably of the agitator type and serves to oscillate the agitator and to drive the wringer. A washing machine of this type comprises generally a tub supported in spaced relation to the floor and having an oscillatory agitator shaft projecting through the bottom of the tub to support and drive the agitator within the tub, and a wringer shaft extending vertically outside the periphery of the tub to drive a wringer mounted adjacent the top of the tub. With the exception of the agitator shaft and the wringer drive shaft, such parts are not shown herein since they are well known in the art.

Mounted under the tub is a drive mechanism for oscillating the agitator shaft and for constantly rotating the wringer drive shaft, and the present invention relates to the structure of this drive mechanism. A drive mechanism embodying the features of the invention is of the type including a rotary driving member connected by a pitman to a reciprocating rack meshing with a pinion mounted on the agitator shaft to oscillate the latter. The rotary driving member is also provided with a connection to the wringer shaft to constantly rotate it.

As mentioned above, the invention provides a drive mechanism, the parts of which are so constructed and related to each other as to reduce wear to a minimum and to facilitate the servicing of the mechanism so that any wear that may occur may be easily taken up. Moreover, the invention provides a mechanism which is relatively simple in construction and facilitates assembly, and disassembly when necessary. The entire mechanism is housed within a casing which is closed in such a manner that a constant supply of oil or grease may be carried therein to adequately lubricate all parts.

In the preferred embodiment, the gear casing comprises a lower section, indicated generally at 10, and an upper section or cover, indicated generally at 11. The lower section comprises a bottom wall 12 and side walls 13, with an open top. The major part of the mechanism is mounted in and is supported by the lower section so that the lower section thus constitutes the casing proper, and the upper section 11 serves chiefly as a cover for the bottom section.

The main driving element of the mechanism comprises a gear 14 rotatably mounted on a vertical stud 15 supported by the bottom wall 12 of the casing. Preferably the stud 15 is fixed to the bottom wall by having a press fit in a lug 16 cast integrally with the bottom wall 12. The main driving element or gear 14 in the present embodiment comprises a worm wheel adapted to be driven by a worm 20.

One of the features of the invention resides in the manner of supporting the worm 20 within the casing, and of providing for adjustment to take up wear in the supporting structure. To this end the worm is mounted on a shaft 21 having its inner end 22 carried by a part of the side wall 13 of the casing in a bore 23 therein. To support the thrust of the worm, the end of the shaft has a conical depression 24 seated against a ball 25 bearing on a hardened plate or disk 26 fitted in the inner end of the bore 23. Spiral oil grooves 27 may be cut into the end 22 of the shaft to carry lubricant to the thrust bearing.

At another point in the side wall of the casing a bore 30 is provided of sufficient size to permit the insertion therethrough of the worm. The shaft 21 extends through the bore 30 to the exterior of the casing and is there provided with a flexible coupling 31 for connection with the shaft 32 of a motor 33 carried on a bracket 34 preferably secured to the side wall of the lower housing 10. To retain the worm in place a shoulder 35 is formed on the shaft and a collar 36 is mounted within the bore 30 in abutment with the shoulder 35. The collar 36 is provided with a bushing 37 in which the shaft 21 is journaled.

The collar 36 serves to hold the worm in place in proper relation to the thrust bearing, and is also adjustable longitudinally to take up any wear of the thrust bearing. Preferably the longitudinal adjustment is constructed so that it may be effected from the exterior of the casing, thus simplifying the service problem. To this end the collar 36 is provided with a pair of slanting surfaces comprising spaced conical indentations 40 in one side thereof (see Figs. 4 and 5). Threaded through the side wall of the casing is a pair of set screws 41 each having a conical inner end 42 complementary to the slanting surface of the indentation 40. The spacing of the screws 41 is slightly greater than the spacing of the indentations 40 so that the conical end of one screw bears against one side of its indentation 40 while the other screw bears against the opposite side of its indentation, as is clearly shown in Fig. 4. Thus when both screws are tightened down the collar 36 is rigidly locked in place.

Should any wear occur in the thrust bearing, take-up may be accomplished by loosening the right-hand screw 41, as shown in Fig. 4, and tightening down the left-hand screw 41. By such action, the complementary slanting surface of the point of the left-hand screw and its depression cause the collar to shift to the left. Consequently, because of the abutment of the collar with the shoulder 35, the shaft and worm are shifted to the left, thus taking up the wear in the thrust bearing. After the collar has thus been shifted the right-hand screw 41 is retightened to firmly lock the collar in place. The right-hand screw 41 also serves to prevent the worm and its shaft from shifting towards the right out of contact with its thrust bearing in case the drive gear 14 should tend to overrun the worm, or in case the torque on the flexible coupling 31 should tend to longitudinally shorten the coupling and thus exert a pull to the right on the shaft 21. The outer end of the bore 30 is preferably closed by an oil seal 43 to prevent the escape of any lubricant from the casing.

The main drive gear or worm wheel 14 is provided with a crank pin 44 upon which is mounted one end of a pitman 45. The other end of the pitman 45 is mounted on a pin 46 carried by a rack 47 mounted for reciprocation on a guide bar 48. The rack 47 meshes with a pinion 50 rotatably mounted on the lower end of the agitator shaft 51. To provide a driving connection between the pinion 50 and the agitator shaft 51, a manually actuated clutch 52 is provided.

Another feature of the invention resides in the manner in which the worm wheel 14 is supported to overcome any tendency of the pitman 45 to tilt the worm wheel 14. To this end, the worm wheel 14, which is rotatable upon the stud 15 and has a slight clearance thereon, is supported by bearing surfaces formed on the lower wall 12 of the casing. In order that such bearing surfaces may most effectively overcome the tendency of the pitman to tilt the wheel, they are located adjacent the periphery of the worm wheel and are in the form of arcuate pads 53 or flat-top ribs cast integrally with the bottom wall of the casing. Said bearing surfaces 53 are located on the near and far side of the worm wheel in the general direction of the pitman, and are concentric with the worm wheel so that the rim thereof at all times bears on these surfaces. Thus the bearing surfaces 53 adequately support the worm wheel against the tendency of the pitman to tilt it.

Spring means are also provided for holding the worm 14 in engagement with the bearing surfaces 53. Such means preferably is mounted on the upper end of the stud shaft 15 and comprises a spring washer 54. The washer 54 is bent to provide a transverse groove 55 (see Figs. 2 and 3) and a pair of opposite lips 56. A pin 57 is inserted through the upper end of the stud 15 transverse to the general direction of the pitman and is seated in the groove 55 in the washer. The lips 56 thus bear against the hub of the worm wheel 14 to resiliently hold it in contact with the bearing surfaces 53. Should any wear occur on the bearing surfaces 53, the resiliency of the washer 54 immediately takes up such wear by pressing the worm wheel downwardly. Preferably a flat washer 58 is inserted between the hub of the worm wheel 14 and the spring washer 54.

To connect the drive with the wringer drive shaft, indicated at 60 and which is preferably coaxial with the stud 15, the crank pin 44 has a pressed fit in the worm wheel 14 and extends from the upper face thereof. On the upper end of the crank pin 44 above the pitman a crank arm 61 is mounted, the arm 61 being rigidly secured to the crank pin by means of a tapered pin 62. The inner end of the crank arm 61 is provided with a non-circular hole coaxial with the stud 15, such as a squared hole 63, to receive the squared lower end 64 of the wringer shaft 60. Thus the wringer shaft 60 is driven constantly in unison with the worm wheel 14.

As mentioned above, one of the features of the invention is to provide a mechanism in which the parts may be easily assembled or disassembled. It will be apparent from the foregoing description that the worm and shaft 21 are readily assembled into the casing by inserting them through the bore 30. In assembling the worm wheel 14 and the other parts, the worm wheel may be placed on the stud 15 through the open top of the lower section of the casing, and the spring washer 54 then put in place. The worm wheel 14 when assembled is provided with the crank pin 44 so that the pitman can then be placed upon the crank pin. Thereafter the crank arm 61 is placed on the crank pin and secured in place by the tapered pin 62. The cover or upper section 11 of the casing is then placed on the lower section and secured by a plurality of screws around its periphery. The cover 11 is provided with an aperture 65 concentric with the stud 15 so that the wringer shaft is inserted through the aperture and the squared end thereof is seated in the crank arm 61. Thus the assembly of the parts of the mechanism is a relatively simple matter.

In the operation of the device, the oscillatory motion of the agitator shaft includes a gradually increasing speed of rotation in one direction, during which the washing fluid and clothing in the tub are started to rotate in that direction, and then a gradually decreasing speed of rotation preparatory to reversal of direction. During the decreasing speed of rotation in either direction there is a tendency of the washing fluid and clothing to cause the mechanism to overrun so that the worm wheel 14 would tend to overrun the worm 20. However, such inertia effect is compensated for by means of the spring washer 54 which causes the worm wheel to bear against the arcuate surfaces 53. The washer 54 and surfaces 53 thus provide a constant drag or braking action on the worm wheel. While such braking action or drag is small in value, it is sufficient to keep the worm in contact with the worm wheel in such a manner as to constantly take up the play in one direction. Thus no noise in operation occurs because of the play between the thread of the worm 20 and the teeth of the worm wheel 13.

From the foregoing description it will be apparent that I have provided a drive mechanism particularly adapted for an oscillatory type of washing machine in which the parts of the mechanism are so arranged as to reduce wear and consequent looseness to a minimum and to provide a simple structure for taking up such wear as it occurs. The collar 36 is adjustable from the exterior of the casing in order to take up wear on the worm thrust bearing and to lock the worm against endwise movement in the other direction. The tendency of the pitman to tilt the worm wheel 13 is nullified by provision of the bearing surfaces 53 adjacent the periphery of the worm wheel, and the spring washer 54 immediately takes up any wear on such surfaces so that the worm wheel 14 is constantly held in a given plane. The spring washer 54 also prevents any play between the thread of the worm and the teeth of the worm wheel from becoming noticeable since such wear is always taken up in one direction. It it further apparent that I have provided a mechanism of the foregoing character in which the parts may be readily assembled and disassembled.

I claim as my invention:

1. In a mechanism of the character described, the combination of a stud, a worm wheel rotatably mounted on said stud, a pair of arcuate surfaces bearing against one face of the worm wheel for supporting the worm wheel adjacent the periphery thereof, a crank pin extending from the opposite face of the worm wheel, a pitman connected to said crank pin, and spring means mounted on said stud and bearing against said opposite face of the worm wheel to hold the worm wheel in bearing contact with said surfaces and thereby provide a braking action on said worm wheel to counteract the tendency of the pitman to cause the worm wheel to overrun.

2. An oscillatory drive mechanism comprising, in combination, a casing, a stud extending from one wall of said casing, a worm wheel rotatably mounted on said stud and supported on one face by said wall, a crank pin extending from the opposite face of said worm wheel, a pitman connected to said crank pin, oscillatory means actuated by said pitman, and a spring washer fixed on the end of said stud and bearing against said opposite face of the gear to cause said wheel to bear against said wall and thereby provide a constant braking action on said worm wheel to overcome the tendency of said oscillatory means to drive upon decreasing speed thereof in either direction.

3. In a mechanism of the character described, the combination of a stud, a worm wheel mounted on said stud, a pair of bearing surfaces supporting one face of said worm wheel at diametrically opposite points, a crank pin extending from the opposite face of said worm wheel, a pitman connected to the crank pin, a spring washer mounted on the end of said stud and bent to provide a transverse groove and two diametrically opposite bearing lips, and a pin extending through said stud and seated in said groove to hold the washer so that said lips hold said worm wheel in bearing contact with said surfaces, the washer and said surfaces thereby providing a braking action on said worm wheel to overcome the tendency of the pitman to cause the worm wheel to overrun.

4. In a mechanism of the character described, the combination of a casing comprising upper and lower walls, a stud fixed in and extending upwardly from said lower wall, a worm wheel rotatably mounted on said stud, bearing surfaces on said lower wall supporting said worm wheel adjacent its periphery, spring means on the upper end of said stud for holding said worm wheel in bearing contact with said surfaces, a wringer drive shaft extending through said upper wall and coaxial with said stud, a crank arm on the lower end of said wringer drive shaft, a crank pin having its ends mounted in said worm wheel and said crank arm, and a pitman mounted on said crank pin between said crank arm and said worm wheel.

5. In a washing machine drive mechanism, the combination of a support comprising a wall, a worm wheel rotatably supported on one face adjacent its periphery by said wall, spring means for holding said worm wheel in flat bearing contact with said wall, and a reciprocatory pitman having one end connected eccentrically to said worm wheel and connected at its other end to washing mechanism, said spring means and said wall cooperating to hold the worm wheel against tilting and to provide a braking action on the worm wheel to prevent overrun thereof under the influence of the washing mechanism.

6. In a washing machine, an agitator shaft, a rotatably driven worm, a worm wheel driven thereby, means connecting said worm wheel to said agitator shaft to oscillate said shaft, and friction means bearing against one face of said worm wheel with the worm wheel and friction means resiliently held in bearing relation thereby, offering frictional resistance to the rotation of the worm wheel of sufficient magnitude to prevent overrun of the worm wheel relative to the worm caused by the inertia effect of the contents of the washing machine.

7. In a washing machine, an agitator shaft, a rotatably driven worm, a worm wheel driven thereby, means connecting said worm wheel to said agitator shaft to oscillate said shaft, and friction means comprising a friction surface engaging one face of the worm wheel and spring means bearing against the opposite face of the worm wheel for causing the worm wheel to bear against said surface, thereby offering sufficient frictional resistance to the rotation of the worm wheel to prevent overrun of the worm wheel relative to the worm caused by the tendency of the contents of the washing machine to cause such overrun.

DELBERT A. RIZOR.